(12) United States Patent
Abe

(10) Patent No.: US 6,707,621 B2
(45) Date of Patent: Mar. 16, 2004

(54) WIDE-ANGLE LENS

(75) Inventor: Yasuhiko Abe, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 10/317,602

(22) Filed: Dec. 12, 2002

(65) Prior Publication Data

US 2003/0128441 A1 Jul. 10, 2003

(30) Foreign Application Priority Data

Dec. 14, 2001 (JP) ........................................ 2001-381320
Dec. 14, 2001 (JP) ........................................ 2001-381420

(51) Int. Cl.[7] .............................................. G02B 13/04
(52) U.S. Cl. ........................................ 359/753; 359/749
(58) Field of Search ................................ 359/749, 750, 359/751, 752, 753

(56) References Cited

U.S. PATENT DOCUMENTS 5,796,528 A  8/1998  Mihara ..................... 359/753
5,812,326 A * 9/1998  Yamada .................... 359/749
6,057,971 A  5/2000  Mihara ..................... 359/793
6,222,685 B1 * 4/2001  Yamada .................... 359/770

FOREIGN PATENT DOCUMENTS

| JP | 09-222555 | 8/1997 |
| JP | 10-048515 | 2/1998 |
| JP | 11-084230 | 3/1999 |
| JP | 11-119094 | 4/1999 |
| JP | 2000-352665 | 12/2000 |

* cited by examiner

Primary Examiner—Scott J. Sugarman
(74) Attorney, Agent, or Firm—Darby & Darby

(57) ABSTRACT

The present invention provides a high-performance, thin wide-angle lens suitable for imaging elements with high pixel counts. The wide-angle lens includes, from an object side to an image plane side: a first lens group including a first lens having a negative refractivity and a second lens having a positive refractivity; and a second lens group including a third lens having a negative refractivity, a fourth lens having a positive refractivity, and a fifth lens having a positive refractivity. The fourth lens is bonded to the third lens. The fifth lens is formed with at least one of its convex surfaces being an aspherical surface.

2 Claims, 8 Drawing Sheets

WIDE-ANGLE LENS

BACKGROUND OF THE INVENTION

The present invention relates to a compact wide-angle lens for use in digital still cameras, video cameras, and other devices that are equipped with an imaging element having a high pixel count such as a CCD.

A lens in a security camera is a conventional wide-angle lens that captures moving images. The conventional wide-angle lens in a security camera does not require high-quality optical characteristics since the imaging element has a relatively low pixel count.

A conventional digital still camera, video camera, and other related devices are used to capture images and do not require high-quality optical characteristics. Additionally, a thin design is desirable for these devices.

Imaging element technology has rapidly advanced in recent years. The advances have led to imaging elements with higher pixel densities and pixel counts and a need for lenses with high-quality optical characteristics.

A recent application of imaging element technology involves the use of a digital still camera to take still images. The still images are transferred to a personal computer to be able to apply various forms of processing. Imaging elements with high pixel densities and high pixel counts are used in digital still cameras to work well with high-resolution displays.

However, few high-quality lenses can handle imaging elements with high pixel densities and high pixel counts. Therefore, there is a demand for lenses that are compact, thin, compatible with high-resolution displays, and the like. A thinner design is particularly important since the size of an imaging element is ⅓ inch or less and, more recently, ½.7 inch.

Imaging elements such as CCD's have a micro-lens attached to the surface of the imaging element. The micro-lens uses incident light efficiently. However, eclipsing takes place if the angle of the incident ray is too large, and the light does not reach the imaging element.

OBJECTS AND SUMMARY OF THE INVENTION

The present invention overcomes the problems described above and provides a wide-angle lens with high-quality optical characteristics that eliminates eclipsing and the like. The wide-angle lens provides a thin, compact, and light-weight design and is inexpensive. The wide-angle lens is suited for imaging elements with high pixel counts of 2 million–3 million.

A wide-angle lens of the present invention includes, from an object side to an image plane side: a first lens group and a second lens group. The first lens group includes a first lens with a negative refractivity and a second lens with a positive refractivity. The second lens group includes a third lens with a negative refractivity, a fourth lens with a positive refractivity, and a fifth lens with positive refractivity. The fourth lens is bonded to the third lens, and the fifth lens is formed with convex surfaces oriented to the object side and the image plane side. At least one of the convex surfaces of the fifth lens is an aspherical surface.

The wide-angle lens satisfies the following conditions (1), (2), (3), and (4):

(1) $0.7|R6|<|R8|<1.3|R6|$, (2) $\upsilon1>\upsilon2, \upsilon3<\upsilon4, \upsilon5>50$, (3) $|f1|>2\ f2$, and (4) $2.5\ f22>f21>f22$, where R6 is the curvature radius on an object-side surface of the third lens; R8 is the curvature radius on an image plane side of the fourth lens; $\upsilon i$ is the Abbe number of i-th lens (i=1–5); f1 is the composite focal length of the first lens group; f2 is the composite focal length of the second lens group; f21 is the composite focal lengths of the third and the fourth lenses in the second lens group; and f22 is the focal length of the fifth lens in the second lens group.

The total lens length of the wide-angle lens (not including the back focal length) is no more than 12 mm. The back focal length is at least 7 mm to allow for the placement of low-pass filters and the like. Additionally, the exit pupil position is at least |20 mm| to prevent eclipsing.

Alternatively, both of the convex surfaces S9, S10 of the fifth lens of the wide-angle lens can be aspherical surfaces. This wide-angle lens satisfies the following conditions (1), (2), (3), and (4):

(1) $0.7|R6|<|R8|<1.3|R6|$, (2) $\upsilon1>\upsilon2, \upsilon3<\upsilon4, \upsilon5>50$, (3) $f1>4\ f2$, and (4) $2.5\ f22>f21>f22$, where R6 is the curvature radius on an object-side surface of the third lens; R8 is the curvature radius on an image plane side of the fourth lens; $\upsilon i$ is the Abbe number of i-th lens (i=1–5); f1 is the composite focal length of the first lens group; f2 is the composite focal length of the second lens group; f21 is the composite focal lengths of the third and the fourth lenses in the second lens group; and f22 is the focal length of the fifth lens in the second lens group.

A wide-angle lens having the structure described above is provided with the total lens length (not including the back focal length) being 10 mm or less, the back focal length being at least 7 mm, and the exit pupil position being at least |20 mm|. The wide-angle lens is compact and thin and has good optical characteristics that are suited for high-density imaging elements with high pixel counts.

The above, and other objects, features and advantages of the present invention will become apparent from the following description read in conjunction with the accompanying drawings, in which like reference numerals designate the same elements.

LIST OF DESCRIPTORS

Figure 1:
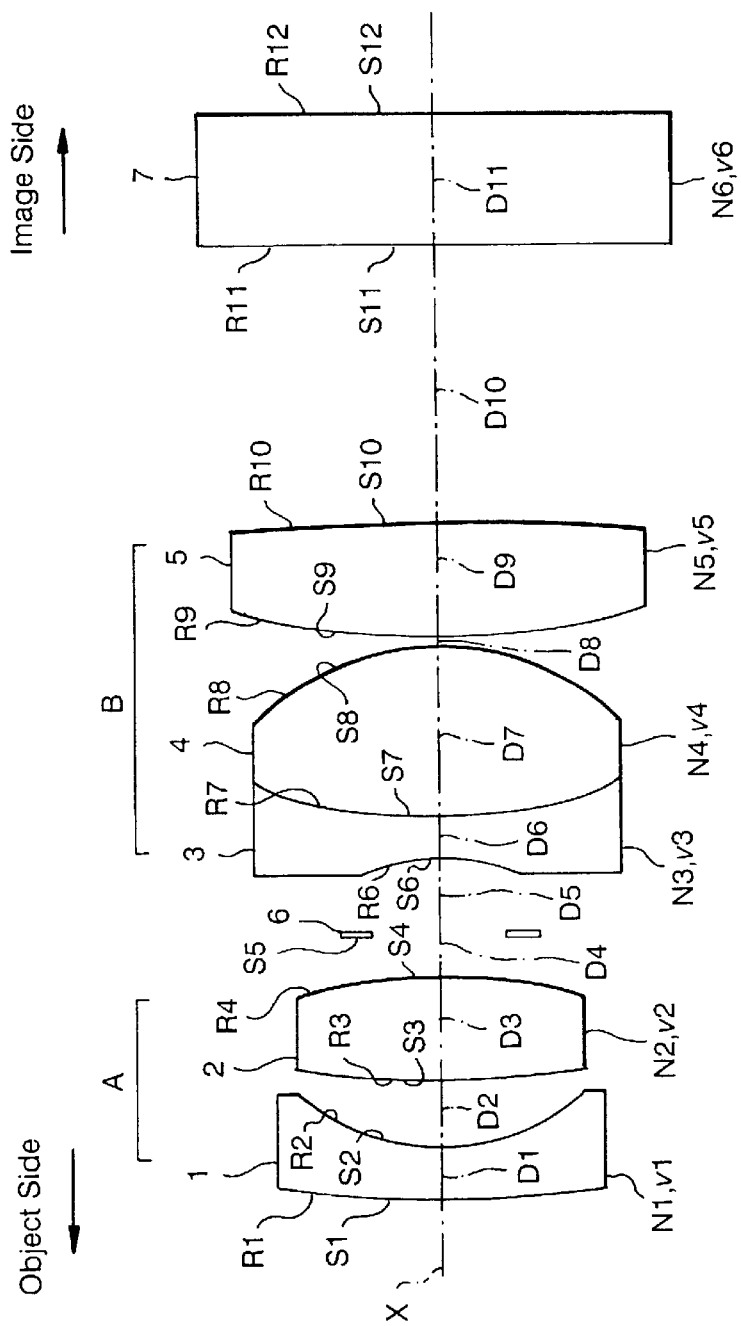
FIG. 1 shows the structure of a wide-angle lens according to an embodiment of the present invention.

1: first lens
2: second lens
3: third lens
4: fourth lens
5: fifth lens
6: aperture stop
A: first lens group
B: second lens group
7: glass filter
D1–D11: distance along optical axis
R1–R12: curvature radius
S1–S12: surface
X: optical axis

DETAILED DESCRIPTION OF THE PREFERRED EMBODIMENTS

FIG. 1 shows the basic structure of a wide-angle lens according to the present invention. The wide-angle lens includes, from the object side to the image plane side: a first lens 1 having a negative refractivity, a second lens 2 having a positive refractivity, a third lens 3 having a negative refractivity, a fourth lens 4 having a positive refractivity, and a fifth lens 5 having a positive refractivity. The fourth lens 4 is bonded to the third lens 3. The fifth lens 5 is formed with convex surfaces oriented toward the object and the image plane, respectively. At least one of the convex surfaces forms an aspherical surface.

An aperture stop 6 is placed between the second lens 2 and the third lens 3, and a glass filter 7 is placed on the side of the fifth lens 5 toward the image plane. The glass filter 7 is formed from an infrared cut filter, a low-pass filter, or the like.

A first lens group A includes the first lens 1 and the second lens 2. A second lens group B includes the third lens 3, the fourth lens 4, and the fifth lens 5. The first lens group A has a composite focal length f1, and the second lens group B has a composite focal length f2. Also, the third lens 3 and the fourth lens 4 in the second lens group B has a composite focal length f21, and the fifth lens 5 has a focal length f22.

Si (i=1–4, 6–10) represents each lens surface of the first lens 1 through the fifth lens 5, Ri (i=1–4, 6–10) represents the curvature radius of the corresponding surface Si, Ni represents the refractivity of the i-th lens at line d, and $\upsilon i$ (i=1–5) represents the Abbe number of the i-th lens as shown in FIG. 1. Si (i=11, 12) represents the surfaces of the glass filter 7, Ri (i=11, 12) represents the curvature radius of the surface Si of the glass filter 7, N6 represents the refractivity at line d of the glass filter 7, and $\upsilon 6$ represents the Abbe number of the glass filter 7. Furthermore, Di (i =1–11) represents the thicknesses and the distances separating each component of the first lens 1 through the glass filter 7 along the optical axis X.

The third lens 3 and the fourth lens 4 in the second lens group B are bonded integrally at the respective surfaces S7 which have identical curvature radii R7. Chromatic aberration is difficult to correct if a single lens is substituted for the third lens 3 and the fourth lens 4. Also, automatic centering is difficult since the curvature radii of the lens surfaces are exactly similar when formed from a single lens. Therefore, chromatic aberration can be corrected by preparing the third lens 3 and the fourth lens 4 separately and then bonding them together. Chromatic aberration affects higher resolutions. Additionally, the lens can be processed more easily since the lenses can be centered separately.

The fifth lens 5 is a double-convex lens formed with convex surfaces S9, S10 on the object side and the image plane side. At least one of the convex surfaces S9, S10 forms an aspherical surface.

The aspherical surface is defined by the following equation:

$$Z=Cy^2/[1+(1-\epsilon C^2y^2)^{1/2}]+Dy^4+Ey^6+Fy^8+Gy^{10}$$

where Z is the distance from the plane which is tangent to the apex of the aspherical surface to the point on the aspherical surface where the height from the optical axis X is y; y is the height from the optical axis X; C is the curvature (1/R) at the apex of the aspherical surface; $\epsilon$ is the conic constant; and D, E, F, and G are the aspherical surface coefficients.

Various forms of aberration can be corrected by forming at least one of the convex surfaces S9, S10 of the fifth lens 5 as an aspherical surface. Coma aberration, in particular, is corrected on rays that pass through the upper part of the lens. At least two more lenses would be required to obtain the same results if the surfaces S9, S10 were formed as spherical surfaces. Therefore, it is impossible to achieve a thin design. The lens can have a thin design and various aberrations can be corrected by forming at least one of the convex surfaces S9, S10 as an aspherical surface. Aberrations that may be corrected by having a shorter total lens length are spherical aberration, astigmatism, and coma aberration.

Figure 3:
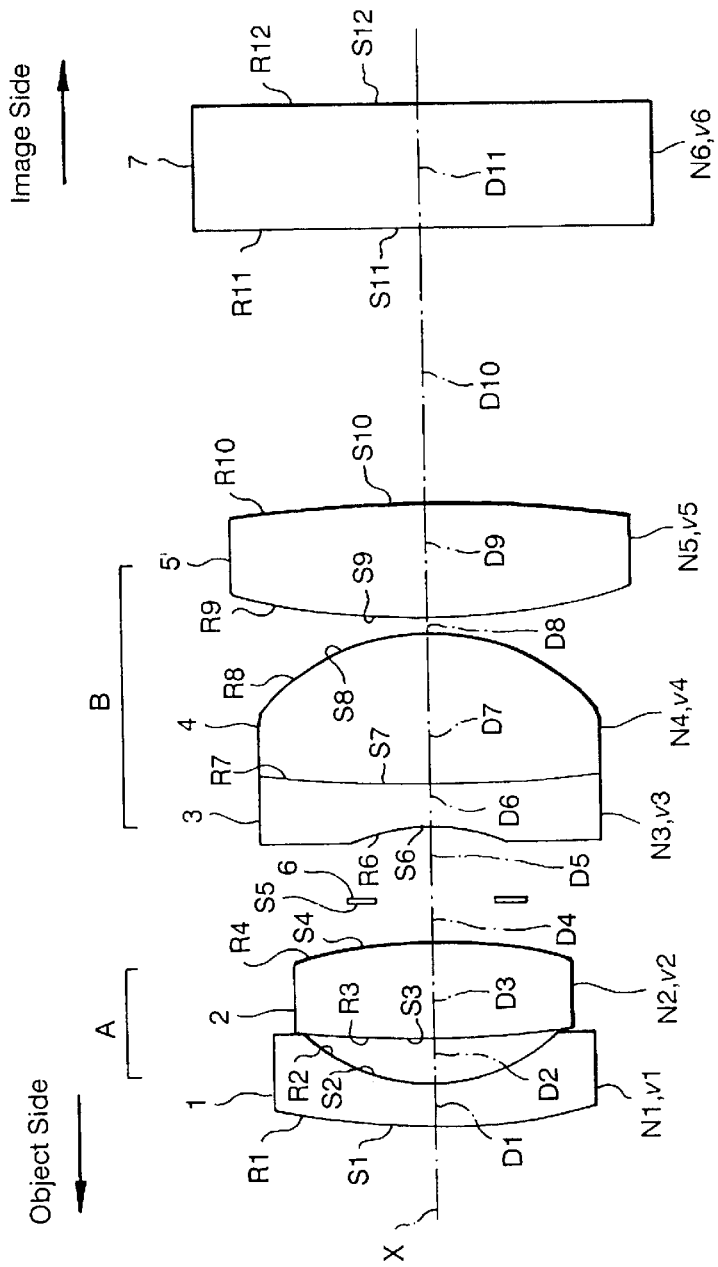
FIG. 3 shows the structure of a wide-angle lens according to an embodiment of the present invention.

The first lens group A and the second lens group B shown in FIGS. 1 and 3 are formed to fulfill the following four conditions:

(1) $0.7|R6|<|R8|<1.3|R6|$
(2) $\upsilon 1>\upsilon 2, \upsilon 3<\upsilon 4, 98\ 5>50$
(3) $|f1|>2\ f2$
(4) $2.5\ f22>f21>f22$ where R6 is the curvature radius of the surface S6 on the object side of the third lens 3, R8 is the curvature radius of the surface S8 on the image side of the fourth lens 4, $\upsilon i$ is the Abbe number of the i-th lens (i=1–5), f1 is the composite focal length of the first length group, f2 is the composite focal length of the second lens group, f21 is the composite focal length of the third lens 3 and the fourth lens 4 of the second lens group, and f22 is the focal length of the fifth lens 5 of the second lens group.

Spherical aberration and coma aberration can be corrected by fulfilling condition (1). Spherical aberration and coma aberration are difficult to correct if this condition is not fulfilled.

Axial chromatic aberration and lateral chromatic aberration can be corrected simultaneously by fulfilling condition (2). Correcting both axial chromatic aberration and lateral chromatic aberration is difficult if this condition is not fulfilled.

Distortion can be corrected and back focus (BF) can be set to a desired value by fulfilling condition (3). A high degree of distortion is present and the distortion is difficult to correct if condition (3) is not fulfilled and the composite focal length f1 of the first lens group A is negative.

The back focus (BF) is short and the thick glass filter 7 is difficult to position if condition (3) is not fulfilled and the composite focal length f1 of the first lens group A is positive. The back focus (BF) is long when condition (3) is fulfilled, and a thin glass filter 7 (e.g., a low-pass filter) can be used to free up more space. As a result, the structure can collapse into this space, and the dimension along the optical axis in this collapsed state can be reduced, thereby providing a thinner design.

The total lens length can be reduced while providing effective correction of various types of aberration by fulfilling condition (4). Correcting various types of aberration, especially astigmatism, while maintaining the desired total lens length will be difficult even with the use of aspherical surfaces if condition (4) is not fulfilled.

Figure 2:
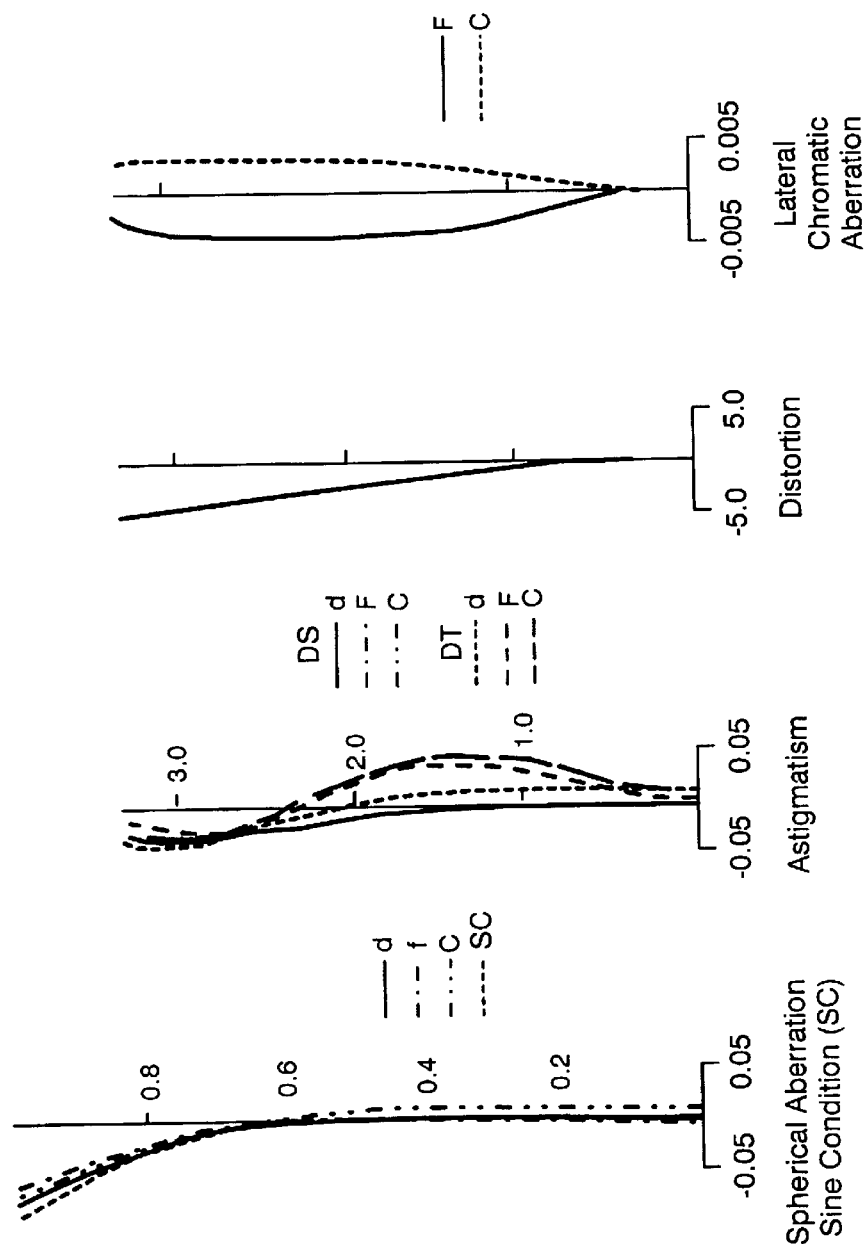
FIG. 2 shows spherical aberration, astigmatism, distortion, and lateral chromatic aberration of a wide-angle lens of FIG. 1.

Tables 1–3 show specific numeric values which are implemented for the structure of the embodiment of the present invention shown in FIG. 1. Table 1 shows the primary specifications, Table 2 shows numerical data relating to the individual lens surfaces, and Table 3 shows numerical data relating to the aspherical surfaces of the embodiment shown in FIG. 1. Furthermore, FIG. 2 shows the aberration line drawings that indicate spherical surface aberration, astigmatism, distortion, and lateral chromatic distortion for the embodiment shown in FIG. 1. In FIG. 2, d indicates the aberration for the line d, F indicates the aberration for the line F, c indicates the aberration for the line c, SC indicates the offense against the sine condition, DS indicates the sagittal plane aberration, and DT indicates the meridional plane aberration.

TABLE 1

| Object distance | Infinite ($\infty$) | Angle of view (2 $\omega$) | 63.7° |
|---|---|---|---|
| Focal length | 5.60 mm | Composite focal length f1 | 19.2 mm |
| F number | 2.86 | Composite focal length f2 | 7.49 mm |
| Exit pupil position | −23.3 mm | Composite focal length f21 | 22.033 mm |
| Total lens length | 11.90 mm | Focal length f22 | 15.752 mm |
| Back focus (air conversion) | 7.31 mm | | |

TABLE 2

| Surface | Curvature radius (mm) | | Axial distance (mm) | | Refractivity (d line) | | Abbe number | |
|---|---|---|---|---|---|---|---|---|
| S1 | R1 | 28.795 | D1 | 0.80 | N1 | 1.62041 | v1 | 60.3 |
| S2 | R2 | 3.433 | | | | | | |
| | | | D2 | 1.20 | | | | |
| S3 | R3 | 12.600 | D3 | 1.80 | N2 | 1.80610 | v2 | 33.3 |
| S4 | R4 | −7.583 | | | | | | |
| | | | D4 | 0.70 | | | | |
| S5 | Aperture stop | | | | | | | |
| | | | D5 | 1.30 | | | | |
| S6 | R6 | −4.487 | D6 | 0.80 | N3 | 1.80518 | v3 | 25.5 |
| S7 | R7 | 7.358 | D7 | 3.00 | N4 | 1.71300 | v4 | 53.9 |
| S8 | R8 | −4.240 | | | | | | |
| | | | D8 | 0.30 | | | | |
| S9* | R9 | 13.223 | D9 | 2.00 | N5 | 1.60602 | v5 | 57.4 |
| S10 | R10 | −32.373 | | | | | | |
| | | | D10 | 4.826 | | | | |
| S11 | R11 | $\infty$ | D11 | 2.254 | N6 | 1.51680 | v6 | 64.2 |
| S12 | R12 | $\infty$ | | | | | | |
| | | | BF | 1.00 | | | | |

*Aspherical surface

TABLE 3

| Aspherical surface coefficient | Numerical Data |
|---|---|
| $\epsilon$ | 1.25352 |
| D | $-0.883422 \times 10^{-3}$ |
| E | $0.930408 \times 10^{-4}$ |
| F | $-0.194193 \times 10^{-4}$ |

TABLE 3-continued

| Aspherical surface coefficient | Numerical Data |
|---|---|
| G | $0.115679 \times 10^{-5}$ |
| H | 0.0 |

The total lens length (not including the back focal length) is 11.90 mm, the back focal length (converted for air) is 7.31 mm, the exit pupil position is −23.3 mm, and the F number is 2.86 in the embodiment shown in FIG. 1. The wide-angle lens is thin, provides good correction of various types of aberration, and has optical characteristics suited for high-density, high pixel count imaging elements.

FIG. 3 shows the basic structure of another embodiment of a wide-angle lens according to the present invention. Both of the convex surfaces S9, S10 of the fifth lens 5' form aspherical surfaces, and the specifications of these lenses are modified. Otherwise, the structure of the embodiment shown in FIG. 3 is the same as the structure of the embodiment shown in FIG. 1 described above.

Figure 4:
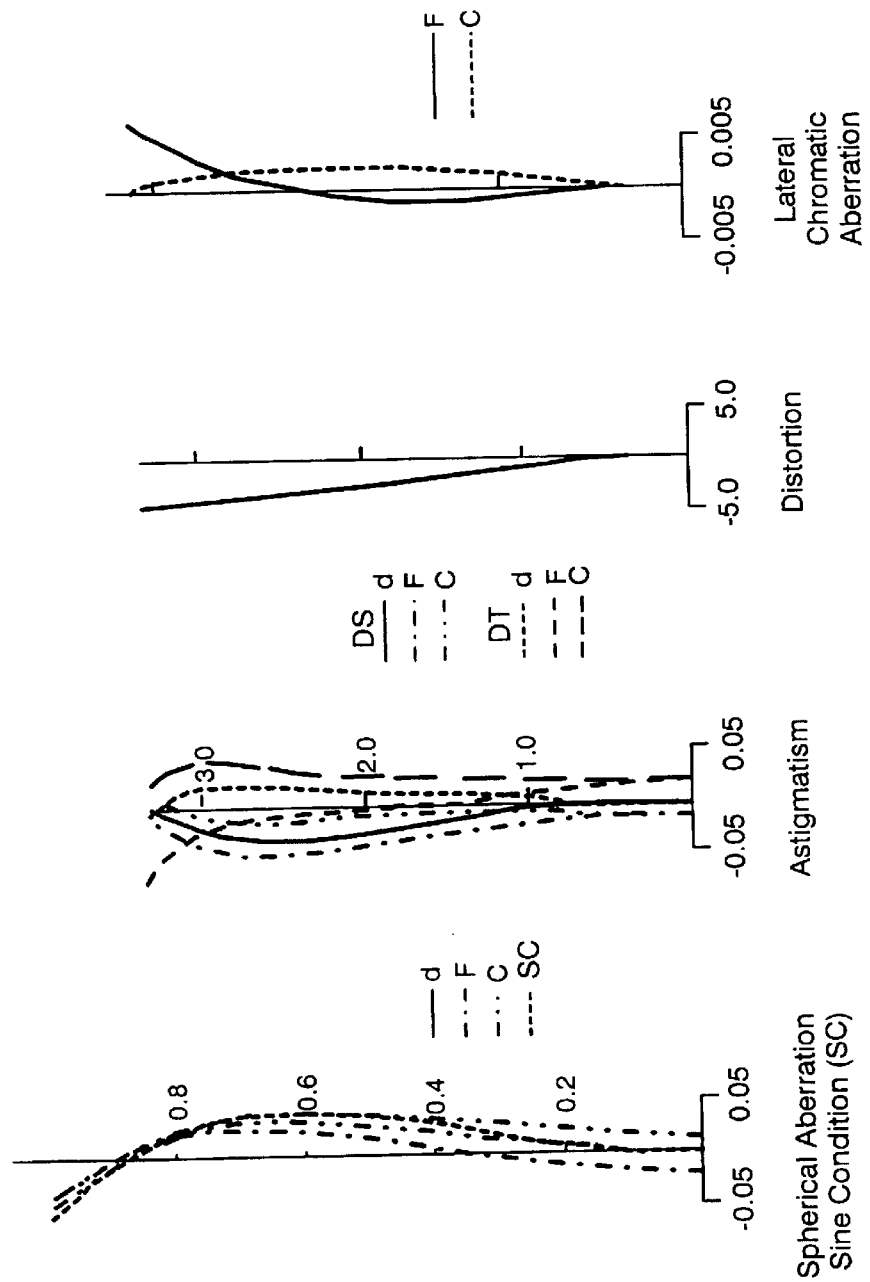
FIG. 4 shows spherical aberration, astigmatism, distortion, and lateral chromatic aberration of a wide-angle lens of FIG. 3.

Tables 4–6 show specific numeric values which are implemented for the structure of the embodiment of the present invention shown in FIG. 3. Table 4 shows the primary specifications, Table 5 shows numerical data relating to the individual lens surfaces, and Table 6 shows numerical data relating to the aspherical surfaces of the embodiment shown in FIG. 3. Furthermore, FIG. 4 shows the aberration line drawings that indicate spherical surface aberration, astigmatism, distortion, and lateral chromatic distortion for the embodiment shown in FIG. 3. In FIG. 4, d indicates the aberration for the line d, F indicates the aberration for the line F, c indicates the aberration for the line c, SC indicates the offense against the sine condition, DS indicates the sagittal plane aberration, and DT indicates the meridional plane aberration.

TABLE 4

| Object distance | Infinite ($\infty$) | Angle of view (2 $\omega$) | 63.1° |
|---|---|---|---|
| Focal length | 5.60 mm | Composite focal length f1 | 29.66 mm |
| F number | 2.86 | Composite focal length f2 | 6.76 mm |
| Exit pupil position | −25.3 mm | Composite focal length f21 | 26.527 mm |
| Total lens length | 11.10 mm | Focal length f22 | 13.043 mm |
| Back focus (air conversion) | 7.54 mm | | |

TABLE 5

| Surface | Curvature radius (mm) | | Axial distance (mm) | | Refractivity (d line) | | Abbe number | |
|---|---|---|---|---|---|---|---|---|
| S1 | R1 | 12.955 | D1 | 0.80 | N1 | 1.69700 | v1 | 48.5 |
| S2 | R2 | 3.315 | | | | | | |
| | | | D2 | 0.70 | | | | |
| S3 | R3 | 16.137 | D3 | 1.80 | N2 | 1.84666 | v2 | 23.8 |
| S4 | R4 | −7.746 | | | | | | |
| | | | D4 | 0.70 | | | | |
| S5 | Aperture stop | | | | | | | |
| | | | D5 | 1.30 | | | | |
| S6 | R6 | −4.056 | D6 | 0.80 | N3 | 1.92286 | v3 | 20.9 |
| S7 | R7 | 37.211 | D7 | 2.70 | N4 | 1.71300 | v4 | 53.9 |
| S8 | R8 | −3.844 | | | | | | |
| | | | D8 | 0.30 | | | | |
| S9* | R9 | 10.819 | D9 | 2.00 | N5 | 1.60602 | v5 | 57.4 |

TABLE 5-continued

| Surface | Curvature radius (mm) | | Axial distance (mm) | Refractivity (d line) | Abbe number |
|---|---|---|---|---|---|
| S10* | R10 | −27.292 | | | |
| | | | D10  5.049 | | |
| S11 | R11 | ∞ | D11  2.254 | N6  1.51680 | υ6  64.2 |
| S12 | R12 | ∞ | | | |
| | | | BF  1.00 | | |

*Aspherical surface

TABLE 6

| Aspherical surface coefficient | Numerical Data | |
|---|---|---|
| | Surface S9 | Surface S10 |
| ε | −2.96405 | 11.28667 |
| D | −0.118129 × 10⁻² | −0.729659 × 10⁻³ |
| E | 0.714737 × 10⁻⁴ | 0.249458 × 10⁻⁴ |
| F | 0.406249 × 10⁻⁵ | 0.116635 × 10⁻⁴ |
| G | −0.338120 × 10⁻⁶ | −0.647454 × 10⁻⁶ |
| H | 0.0 | 0.0 |

The total lens length (not including the back focal length) is 11.10 mm, the back focal length (converted for air) is 7.54 mm, the exit pupil position is −25.3 mm, and the F number is 2.86 in the embodiment shown in FIG. 3. The wide-angle lens is thin, provides good correction of various types of aberration, and has optical characteristics suited for high-density, high pixel count imaging elements.

The present invention provides a wide-angle lens having good optical characteristics and a design that is compact, thin, light, less expensive, and the like. This wide-angle lens effectively corrects various types of aberration and reduces eclipsing and the like in the imaging element.

A thin design is provided in the embodiments shown in FIGS. 1 and 3 since the total length of the lens (not including the back focal length) is 12 mm or less. The back focal length is at least 5 mm to install low-pass filters or the like. The exit pupil position is at least |20 mm| to prevent eclipsing and the like. The resulting wide-angle lens is suitable for high pixel count imaging elements with 2 million–3 million pixels and maintains brightness with an F number of approximately 2.8.

Figure 5:
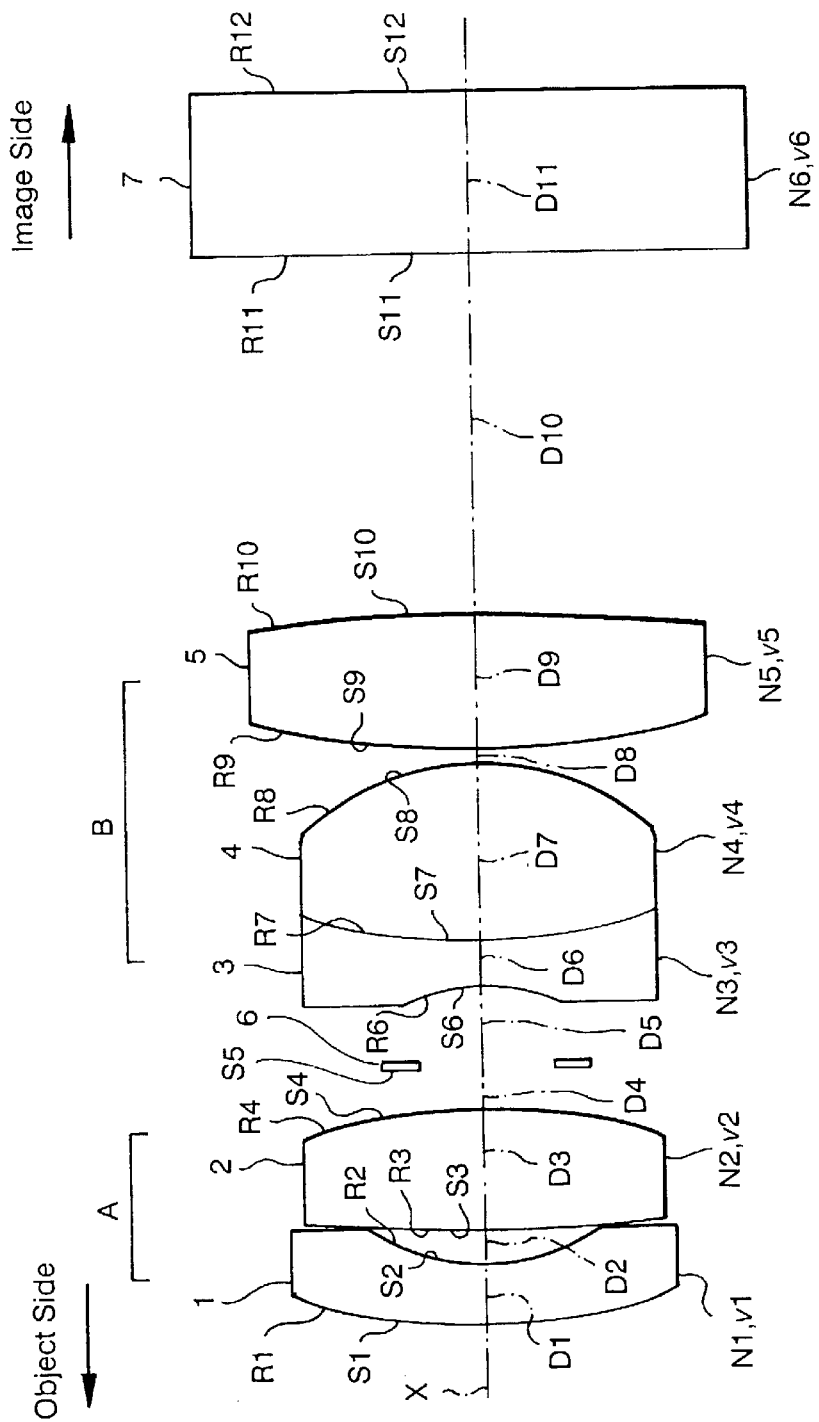
FIG. 5 shows the structure of a wide-angle lens according to an embodiment of the present invention.

FIG. 5 shows the basic structure of a wide-angle lens according to the present invention. The wide-angle lens includes, from the object side to the image plane side: a first lens 1 having a negative refractivity, a second lens 2 having a positive refractivity, a third lens 3 having a negative refractivity, a fourth lens 4 having a positive refractivity, and a fifth lens 5 having a positive refractivity. The fourth lens 4 is bonded to the third lens 3. The fifth lens 5 comprises a first convex surface oriented to the object side and a second convex surface oriented to the image plane side, both of said convex surfaces being ashperical surfaces.

An aperture stop 6 is placed between the second lens 2 and the third lens 3, and a glass filter 7 is placed on the side of the fifth lens 5 toward the image plane. The glass filter 7 is formed from an infrared cut filter, a low-pass filter, or the like.

A first lens group A includes the first lens 1 and the second lens 2. A second lens group B includes the third lens 3, the fourth lens 4, and the fifth lens 5. The first lens group A has a composite focal length f1, and the second lens group B has a composite focal length f2. Also, the third lens 3 and the fourth lens 4 in the second lens group B has a composite focal length f21, and the fifth lens 5 has a focal length f22.

In FIG. 5, Si (i=1–4, 6–10) represents each lens surface of the first lens 1 through the fifth lens 5, Ri (i=1–4, 6–10) represents the curvature radius of the corresponding surface Si, Ni represents the refractivity of the i-th lens at line d, and υi (i=1–5) represents the Abbe number of the i-th lens as shown in FIG. 1. Si (i=11, 12) represents the surfaces of the glass filter 7, Ri (i=11, 12) represents the curvature radius of the surface Si of the glass filter 7, N6 represents the refractivity at line d of the glass filter 7, and υ6 represents the Abbe number of the glass filter 7. Furthermore, Di (i=1–5) represents the thicknesses and the distances separating each component of the first lens 1 through the glass filter 7 along the optical axis X.

The third lens 3 and the fourth lens 4 in the second lens group B are bonded integrally at the respective surfaces S7 which have identical curvature radii R7. Chromatic aberration is difficult to correct if a single lens is substituted for the third lens 3 and the fourth lens 4. Also, automatic centering is difficult since the curvature radii of the lens surfaces are exactly similar when formed from a single lens. Therefore, chromatic aberration can be corrected by preparing the third lens 3 and the fourth lens 4 separately and then bonding them together. Chromatic aberration affects higher resolutions. Additionally, the lens can be processed more easily since the lenses can be centered separately.

The fifth lens 5 is a double-convex lens formed with convex surfaces S9, S10 on the object side and the image plane side. Both of the convex surfaces S9, S10 forms an aspherical surface.

The aspherical surface is defined by the following equation:

$$Z=Cy^2/[1+(1-\epsilon C^2 y^2)^{1/2}]+Dy^4+Ey^6+Fy^8+Gy^{10}+Hy^{12}$$

where Z is the distance from the plane which is tangent to the apex of the aspherical surface to the point on the aspherical surface where the height from the optical axis X is y; y is the height from the optical axis X; y is the height from the optical axis X; C is the curvature (1/R) at the apex of the aspherical surface; ε is the conic constant; and D, E, F, G, and H are the aspherical surface coefficients.

Figure 7:
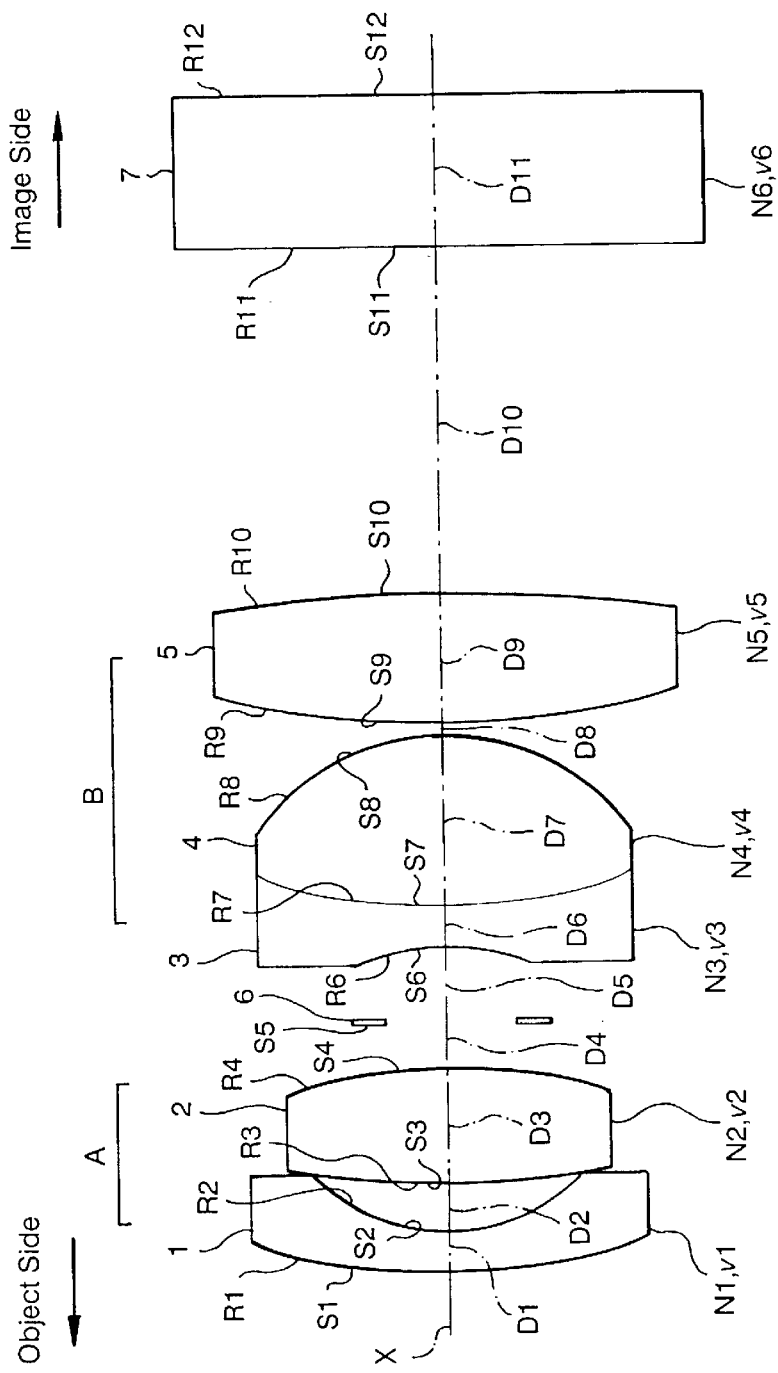
FIG. 7 shows the structure of a wide-angle lens according to an embodiment of the present invention.

Alternatively, both of the convex surfaces S9, S10 of the fifth lens of the wide-angle lens can be aspherical surfaces. The first lens group A and the second lens group B of this structure, which is shown in FIGS. 5 and 7, can be formed to fulfill the following four conditions:

(1) 0.7|R6|<|R8|<1.3|R6|, (2) υ1>υ2, υ3<υ4, 98 5>50, (3) f1>4 f2, and (4) 2.5 f22>f21>f22, where R6 is the curvature radius on an object-side surface of the third lens; R8 is the curvature radius on an image plane side of the fourth lens; υi is the Abbe number of i-th lens (i=1–5); f1 is the composite focal length of the first lens group; f2 is the composite focal length of the second lens group; f21 is the composite focal lengths of the third and the fourth lenses in the second lens group; and f22 is the focal length of the fifth lens in the second lens group.

Spherical aberration and coma aberration can be corrected by fulfilling condition (1). Spherical aberration and coma aberration are difficult to correct if this condition is not fulfilled.

Axial chromatic aberration and lateral chromatic aberration can be corrected at the same time by fulfilling condition (2). Correcting both axial chromatic aberration and lateral chromatic aberration is difficult if this condition is not fulfilled.

Back focus (BF) can be set to a desired value by fulfilling condition (3). The back focus (BF) is short and the thick glass filter 7 is difficult to position if condition (3) is not fulfilled. The back focus (BF) is long when condition (3) is fulfilled, and a thick glass filter 7 is able to be positioned. A thin glass filter 7 (e.g., a low-pass filter) can be used to free up more space. As a result, the structure can collapse into this space, and the dimension along the optical axis in this collapsed state can be reduced, thereby providing a thinner design.

The total lens length can be reduced while providing effective correction of various types of aberration by fulfilling condition (4). Correcting various types of aberration, especially astigmatism, while maintaining the desired total lens length will be difficult even with the use of aspherical surfaces if condition (4) is not fulfilled.

Figure 6:
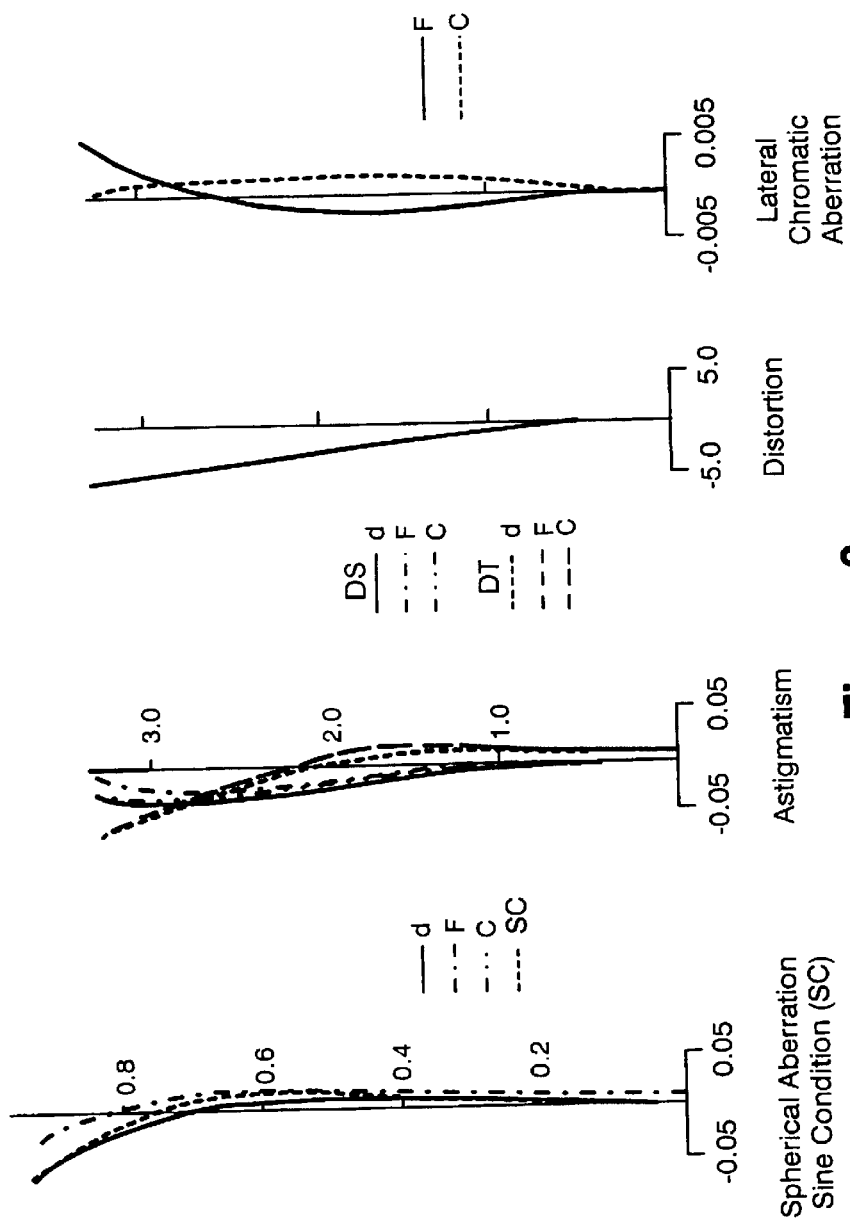
FIG. 6 shows spherical aberration, astigmatism, distortion, and lateral chromatic aberration of a wide-angle lens of FIG. 5.

Tables 7–9 show specific numeric values which are implemented for the structure of the embodiment of the present invention shown in FIG. 5. Table 7 shows the primary specifications, Table 8 shows numerical data relating to the individual lens surfaces, and Table 9 shows numerical data relating to the aspherical surfaces of the embodiment shown in FIG. 5. Furthermore, FIG. 6 shows the aberration line drawings that indicate spherical surface aberration, astigmatism, distortion, and lateral chromatic distortion for the embodiment shown in FIG. 5. d indicates the aberration for the line d, F indicates the aberration for the line F, c indicates the aberration for the line c, SC indicates the offense against the sine condition, DS indicates the sagittal plane aberration, and DT indicates the meridional plane aberration.

TABLE 7

| Object distance | Infinite (∞) | Angle of view (2 ω) | 60.7° |
|---|---|---|---|
| Focal length | 5.96 mm | Composite focal length f1 | 33.3 mm |
| F number | 3.19 | Composite focal length f2 | 6.56 mm |
| Exit pupil position | −20.9 mm | Composite focal length f21 | 25.467 mm |
| Total lens length | 9.90 mm | Focal length f22 | 12.986 mm |
| Back focus (air conversion) | 7.52 mm | | |

TABLE 8

| Surface | Curvature radius (mm) | | Axial distance (mm) | | Refractivity (d line) | | Abbe number |
|---|---|---|---|---|---|---|---|
| S1 | R1 | 8.101 | D1 | 0.85 | N1 1.69680 | ν1 | 55.5 |
| S2 | R2 | 3.302 | | | | | |
| | | | D2 | 0.40 | | | |
| S3 | R3 | 15.835 | D3 | 1.70 | N2 1.84666 | ν2 | 23.8 |
| S4 | R4 | −9.729 | | | | | |
| | | | D4 | 0.60 | | | |
| S5 | Aperture stop | | | | | | |
| | | | D5 | 1.10 | | | |
| S6 | R6 | −3.302 | D6 | 0.70 | N3 1.84666 | ν3 | 23.8 |
| S7 | R7 | 7.605 | D7 | 2.50 | N4 1.74330 | ν4 | 49.2 |
| S8 | R8 | −3.557 | | | | | |
| | | | D8 | 0.15 | | | |
| S9* | R9 | 9.835 | D9 | 1.90 | N5 1.60602 | ν5 | 57.4 |
| S10* | R10 | −36.510 | | | | | |
| | | | D10 | 5.037 | | | |
| S11 | R11 | ∞ | D11 | 2.254 | N6 1.51680 | ν6 | 64.2 |
| S12 | R12 | ∞ | | | | | |
| | | | BF | 1.00 | | | |

*Aspherical surface

TABLE 9

| Aspherical surface coefficient | Numerical Data | |
|---|---|---|
| | Surface S9 | Surface S10 |
| ε | 0.95866 | 37.83534 |
| D | −0.123947 × 10⁻² | −0.389469 × 10⁻³ |
| E | 0.351236 × 10⁻⁴ | −0.289693 × 10⁻⁴ |
| F | 0.355366 × 10⁻⁵ | 0.117216 × 10⁻⁴ |
| G | 0.450740 × 10⁻⁶ | −0.375712 × 10⁻⁶ |
| H | 0.0 | 0.0 |

The total lens length (not including the back focal length) is 9.90 mm, the back focal length (converted for air) is 7.52 mm, the exit pupil position is −20.9 mm, and the F number is 3.19 in the embodiment shown in FIG. 5. The wide-angle lens is thin, provides good correction of various types of aberration, and has optical characteristics suited for high-density, high pixel count imaging elements.

FIG. 7 shows the basic structure of another embodiment of a wide-angle lens according to the present invention. The structure of the embodiment shown in FIG. 7 is the same as the structure of the embodiment shown in FIG. 5 described above except various lens specifications have been changed.

Figure 8:
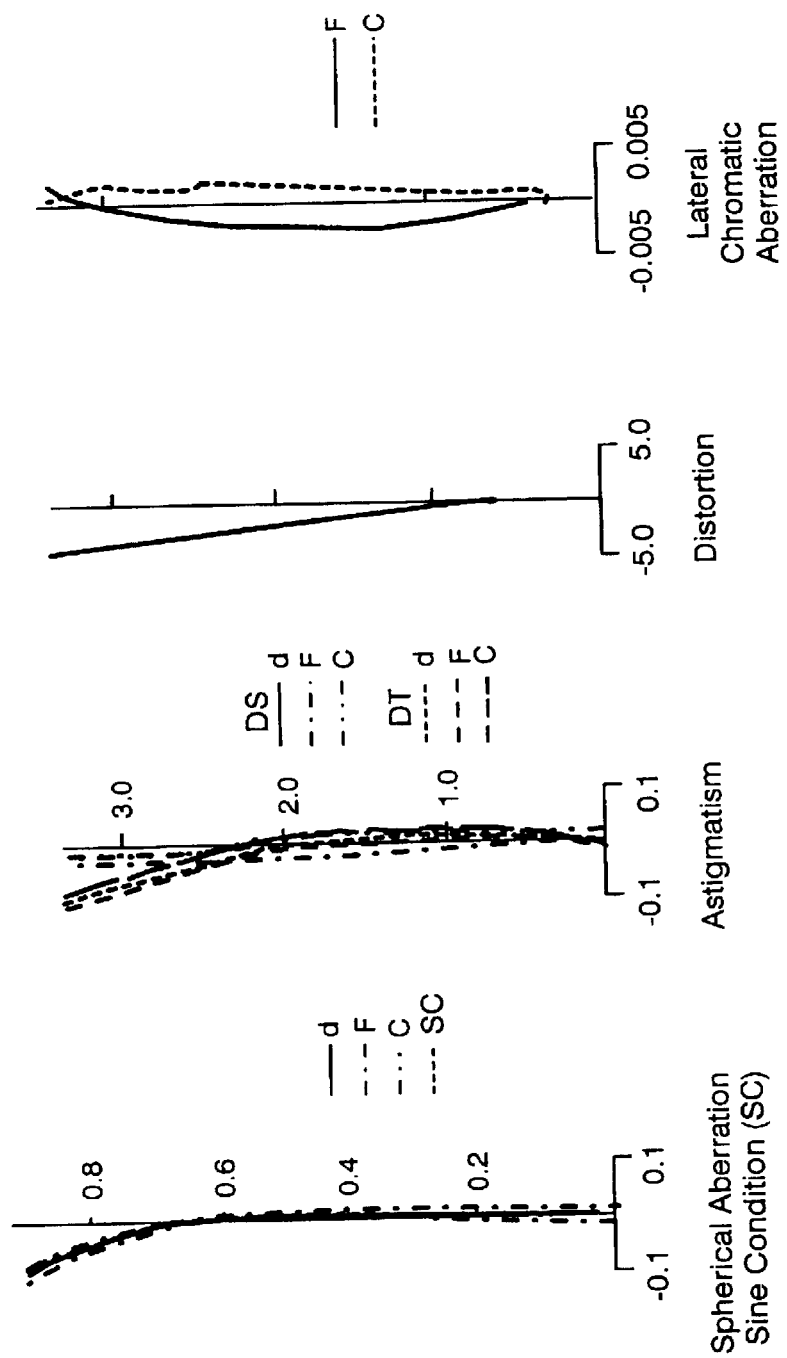
FIG. 8 shows spherical aberration, astigmatism, distortion, and lateral chromatic aberration of a wide-angle lens of FIG. 7.

Tables 10–12 show specific numeric values which are implemented for the structure of the embodiment of the present invention shown in FIG. 7. Table 10 shows the primary specifications, Table 11 shows numerical data relating to the individual lens surfaces, and Table 12 shows numerical data relating to the aspherical surfaces of the embodiment shown in FIG. 7. Furthermore, FIG. 8 shows the aberration line drawings that indicate spherical surface aberration, astigmatism, distortion, and lateral chromatic distortion for the embodiment shown in FIG. 7. d indicates the aberration for the line d, F indicates the aberration for the line F, c indicates the aberration for the line c, SC indicates the offense against the sine condition, DS indicates the sagittal plane aberration, and DT indicates the meridional plane aberration.

TABLE 10

| Object distance | Infinite (∞) | Angle of view (2 ω) | 62.0° |
|---|---|---|---|
| Focal length | 5.80 mm | Composite focal length f1 | 31.2 mm |
| F number | 3.19 | Composite focal length f2 | 6.87 mm |
| Exit pupil position | −20.2 mm | Composite focal length f21 | 23.726 mm |
| Total lens length | 9.95 mm | Focal length f22 | 14.056 mm |
| Back focus (air conversion) | 7.71 mm | | |

TABLE 11

| Surface | Curvature radius (mm) | | Axial distance (mm) | | Refractivity (d line) | | Abbe number |
|---|---|---|---|---|---|---|---|
| S1 | R1 | 9.256 | D1 | 0.70 | N1 1.69700 | ν1 | 48.5 |
| S2 | R2 | 3.121 | | | | | |
| | | | D2 | 0.60 | | | |
| S3 | R3 | 16.189 | D3 | 1.70 | N2 1.84666 | ν2 | 23.8 |
| S4 | R4 | −8.124 | | | | | |
| | | | D4 | 0.60 | | | |
| S5 | Aperture stop | | | | | | |
| | | | D5 | 1.10 | | | |
| S6 | R6 | −3.469 | D6 | 0.70 | N3 1.84666 | ν3 | 23.8 |
| S7 | R7 | 13.791 | D7 | 2.50 | N4 1.69680 | ν4 | 55.5 |

TABLE 11-continued

| Surface | Curvature radius (mm) | | Axial distance (mm) | Refractivity (d line) | Abbe number |
|---|---|---|---|---|---|
| S8 | R8 | −3.435 | | | |
| | | | D8 0.15 | | |
| S9 * | R9 | 10.099 | D9 1.90 | N5 1.60602 | ν5 57.4 |
| S10 * | R10 | −50.573 | | | |
| | | | D10 5.227 | | |
| S11 | R11 | ∞ | D11 2.254 | N6 1.51680 | ν6 64.2 |
| S12 | R12 | ∞ | | | |
| | | | BF 1.00 | | |

*Aspherical surface

TABLE 12

| Aspherical surface coefficient | Numerical Data | |
|---|---|---|
| | Surface S9 | Surface S10 |
| ε | 0.68893 | 51.40246 |
| D | −0.125672 × 10$^{-2}$ | −0.286438 × 10$^{-3}$ |
| E | 0.313431 × 10$^{-4}$ | −0.457305 × 10$^{-4}$ |
| F | −0.599045 × 10$^{-7}$ | 0.132392 × 10$^{-4}$ |
| G | −0.100572 × 10$^{-6}$ | −0.584476 × 10$^{-6}$ |
| H | 0.0 | −0.242376 × 10$^{-7}$ |

The total lens length (not including the back focal length) is 9.95 mm, the back focal length (converted for air) is 7.71 mm, the exit pupil position is −20.2 mm, and the F number is 3.19 in the embodiment shown in FIG. 7. The wide-angle lens is thin, provides good correction of various types of aberration, and has optical characteristics suited for high-density, high pixel count imaging elements.

The present invention provides a wide-angle lens having good optical characteristics and a design that is compact, thin, light, less expensive, and the like. This wide-angle lens effectively corrects various types of aberration and reduces eclipsing and the like in the imaging element.

A thin design is provided in the embodiments shown in FIGS. 5 and 7 since the total length of the lens (not including the back focal length) is 10 mm or less. The back focal length is at least 7 mm to install relatively thick low-pass filters or the like. The exit pupil position is at least |20 mm| to prevent eclipsing and the like. The resulting wide-angle lens is suitable for high pixel count imaging elements with 2 million–3 million pixels.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A wide-angle lens comprising, from an object side to an image plane side:
    a first lens group comprising:
        a first lens having a negative refractivity, and
        a second lens having a positive refractivity; and
    a second lens group comprising:
        a third lens having a negative refractivity,
        a fourth lens having a positive refractivity, said fourth lens being bonded to said third lens, and
        a fifth lens having a positive refractivity, said fifth lens comprising a first convex surface oriented to said object side and a second convex surface oriented to said image plane side, at least one of said convex surfaces being an aspherical surface;
wherein:
    (1) 0.7|R6|<|R8|<1.3|R6|
    (2) ν1>ν2, ν3<ν4, 98 5>50
    (3) |f1|>2 f2
    (4) 2.5 f22>f21>f22,
where R6 is a curvature radius of an object-side surface of said third lens;
    R8 is a curvature radius of an image plane-side surface of said fourth lens;
    νi is an Abbe number of an i-th lens (i=1–5);
    f1 is a composite focal length of said first lens group;
    f2 is a composite focal length of said second lens group;
    f21 is a composite focal length of said third and said fourth lenses in said second lens group;
    f22 is a focal length of said fifth lens in said second lens group.

2. A wide-angle lens comprising, from an object side to an image plane side:
    a first lens group comprising:
        a first lens having a negative refractivity, and
        a second lens having a positive refractivity; and
    a second lens group comprising:
        a third lens having a negative refractivity,
        a fourth lens having a positive refractivity, said fourth lens being bonded to said third lens, and
        a fifth lens having a positive refractivity, said fifth lens comprising a first convex surface oriented to said object side and a second convex surface oriented to said image plane side, both of said convex surfaces being aspherical surfaces;
wherein:
    (1) 0.7|R6|<|R8|<1.3|R6|
    (2) ν1>ν2, ν3<ν4, 98 5>50
    (3) f1>4 f2
    (4) 2.5 f22>f21>f22,
where R6 is a curvature radius of an object-side surface of said third lens;
    R8 is a curvature radius of an image plane-side surface of said fourth lens;
    νi is an Abbe number of an i-th lens (i=1–5);
    f1 is a composite focal length of said first lens group;
    f2 is a composite focal length of said second lens group;
    f21 is a composite focal length of said third and said fourth lenses in said second lens group;
    f22 is a focal length of said fifth lens in said second lens group.

* * * * *